United States Patent
Sheu

(10) Patent No.: US 9,002,208 B2
(45) Date of Patent: Apr. 7, 2015

(54) OPTICAL TRANSCEIVER SYSTEM

(71) Applicant: Yi-Zhong Sheu, New Taipei (TW)

(72) Inventor: Yi-Zhong Sheu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 232 days.

(21) Appl. No.: 13/661,123

(22) Filed: Oct. 26, 2012

(65) Prior Publication Data

US 2013/0251377 A1    Sep. 26, 2013

(30) Foreign Application Priority Data

Mar. 20, 2012 (TW) .............................. 101109409 A

(51) Int. Cl.
*H04B 10/00* (2013.01)
*H04B 10/40* (2013.01)

(52) U.S. Cl.
CPC ....................................... *H04B 10/40* (2013.01)

(58) Field of Classification Search
CPC ........ H04B 10/25; H04B 10/40; H04B 10/43; H04J 14/0215; H04J 14/0216; G02B 6/2848; G02B 6/4201; G02B 6/4204; G02B 6/4212; G02B 6/4246; G02B 6/4214
USPC ................................................ 398/135–139
See application file for complete search history.

(56) References Cited

U.S. PATENT DOCUMENTS

| 4,551,829 | A  | * | 11/1985 | Dragoo et al. .................. 398/82 |
| 6,043,104 | A  | * | 3/2000 | Uchida et al. ................... 438/32 |
| 7,068,903 | B2 | * | 6/2006 | Kittaka et al. ................. 385/129 |
| 2003/0142385 | A1 | * | 7/2003 | Kittaka et al. ................. 359/279 |
| 2004/0008437 | A1 | * | 1/2004 | Kittaka et al. ................. 359/883 |
| 2005/0147353 | A1 | * | 7/2005 | Vancoill et al. .................. 385/47 |
| 2009/0202252 | A1 | * | 8/2009 | Sunaga et al. ................. 398/139 |
| 2009/0273784 | A1 | * | 11/2009 | Yamagaki et al. ............. 356/365 |
| 2011/0097037 | A1 | * | 4/2011 | Kuznia et al. ................... 385/33 |
| 2012/0128306 | A1 | * | 5/2012 | Sheu et al. ...................... 385/88 |
| 2012/0213527 | A1 | * | 8/2012 | Duijn et al. ................... 398/139 |
| 2013/0148969 | A1 | * | 6/2013 | Sheu .............................. 398/79 |

* cited by examiner

*Primary Examiner* — Li Liu
(74) *Attorney, Agent, or Firm* — Novak Druce Connolly Bove + Quigg LLP

(57) ABSTRACT

An optical transceiver system includes a transmitter emitting a first light beam having a first wavelength, a receiver receiving a second light beam having a second wavelength; an optical fiber transmitting the first light beam and the second light beam; and a light guide member. The light guide member includes a lens block having a bottom surface facing toward both the transmitter and the receiver, a first side surface slanted relative to the bottom surface, and a second side surface facing toward the optical fiber, a first lens and a second lens formed on the bottom surface for optically coupled with the respective transmitter and receiver, a third lens formed on the second side surface for optically coupled with the optical fiber, and a light guide portion embedded in the lens block.

12 Claims, 4 Drawing Sheets

OPTICAL TRANSCEIVER SYSTEM

BACKGROUND

1. Technical Field

The present disclosure relates to optical transceiver technology and, particularly, to an optical transceiver system.

2. Description of Related Art

In an optical transceiver system, a number of optical fibers are needed for transmitting light beams from a transmitter to an outside of the optical transceiver system, and for transmitting light beams to a receiver from the outside of the optical transceiver system. This makes the optical transceiver system complicated.

Therefore, it is desirable to provide an optical transceiver system, which can overcome or at least alleviate the limitations described.

DETAILED DESCRIPTION

Figure 1:
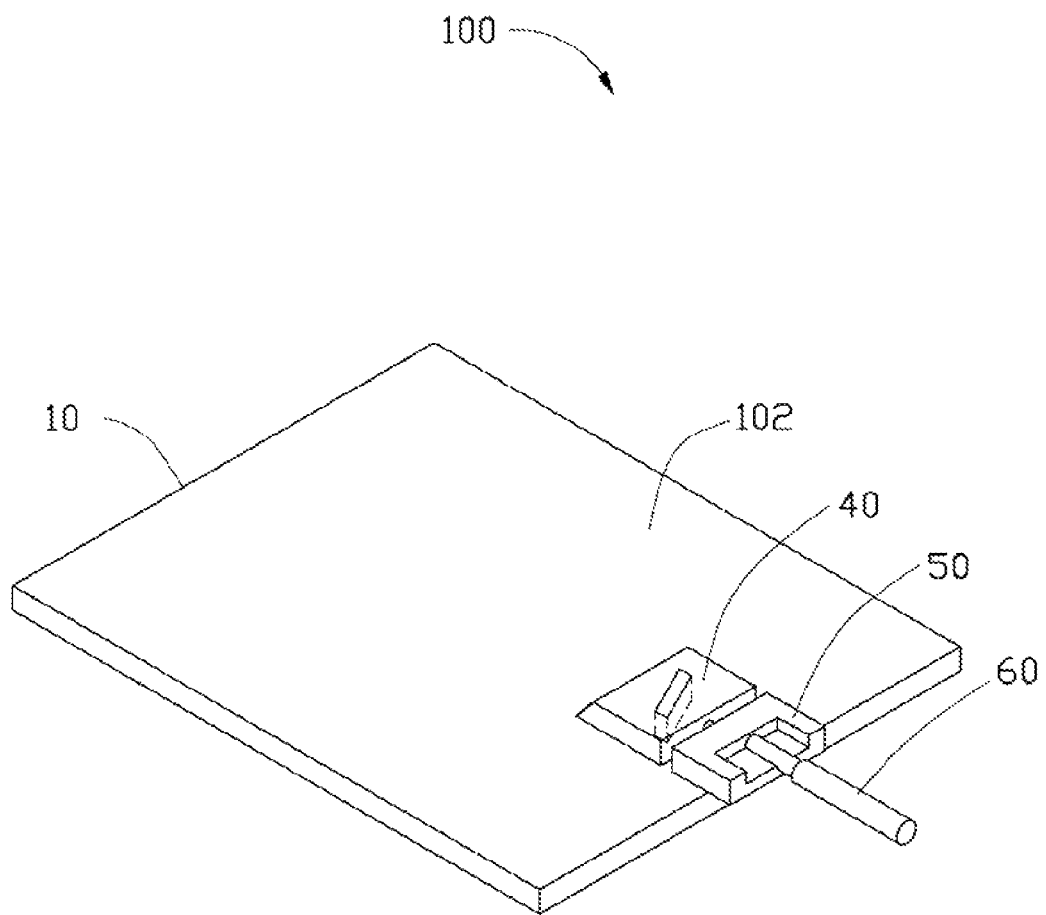
FIG. 1 is a schematic, isometric view of an optical transceiver system including a light guide member, according to an exemplary embodiment.
Figure 2:
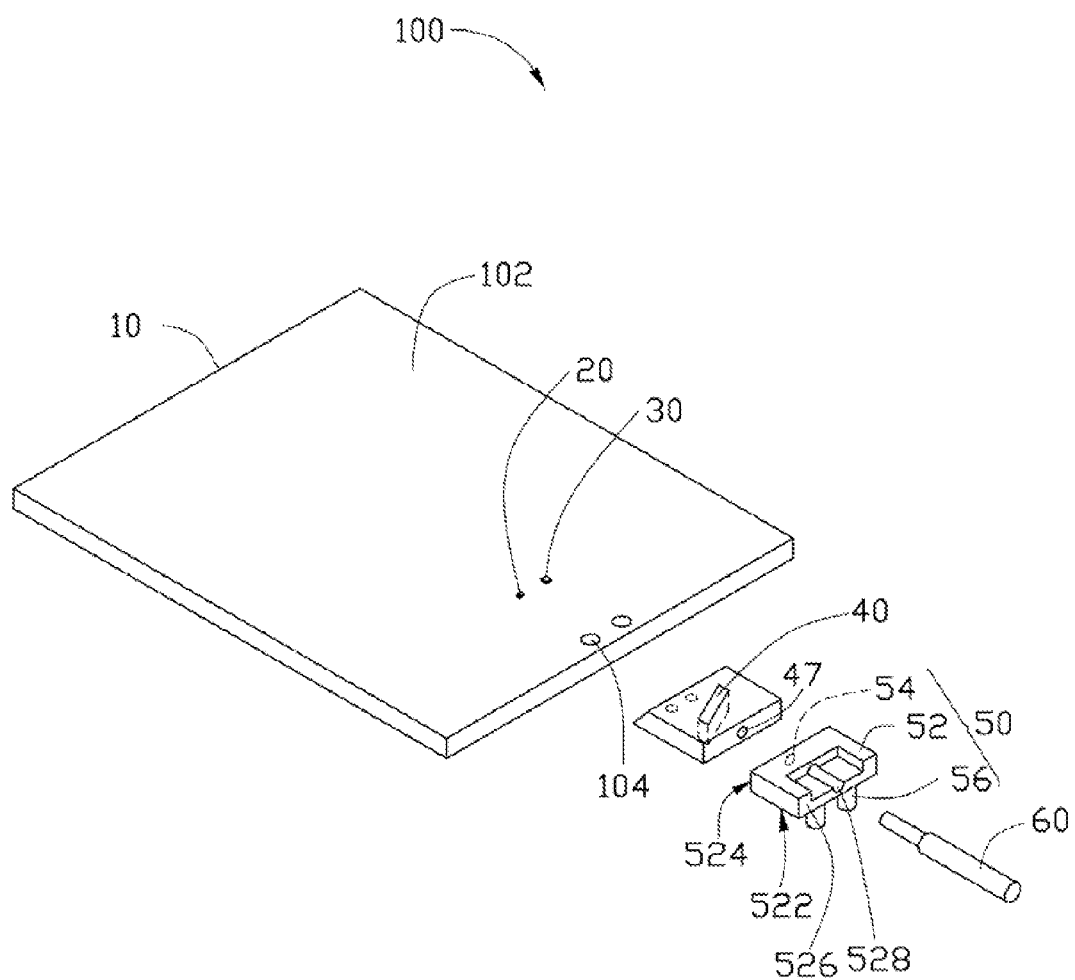
FIG. 2 is an explode view of the optical transceiver system of FIG. 1.

Referring to FIGS. 1-2, an optical transceiver system 100, according to an exemplary embodiment is shown. The optical transceiver system 100 includes a substrate 10, a transmitter 20, a receiver 30, a light guide member 40, a connector 50, and an optical fiber 60.

The substrate 10 is a rectangular circuit board and includes a supporting surface 102. Two engaging holes 104 are defined in the supporting surface 102. The transmitter 20, the receiver 30, the light guide member 40, the connector 50, and the optical fiber 60 are positioned on the supporting surface 102.

The transmitter 20 and the receiver 30 are attached to the supporting surface 102 with adhesive and are apart from each other. The transmitter 20 may include one or more laser diodes and modulators for modulating light wave emitted from the laser diodes according to electrical signals needed to be uploaded. The receiver 30 may include one or more photoelectric converters, such as photodiodes for receiving and converting light signals into electrical signals. The transmitter 20 is configured for emitting a first light beam L1. The receiver 30 is configured for receiving a second light beam L2. The direction of the first light beam L1 is reversed to the direction of the second light beam L2. A first wavelength of the first light beam L1 is different from the second wavelength of the second light beam L2, for example, the first light beam L1 is a red light beam having a first wavelength in a range from 622 nanometers (nm) to 770 nm, and the second light beam L2 is a blue light beam having a second wavelength in a range from 350 nm to 455 nm.

Figure 3:
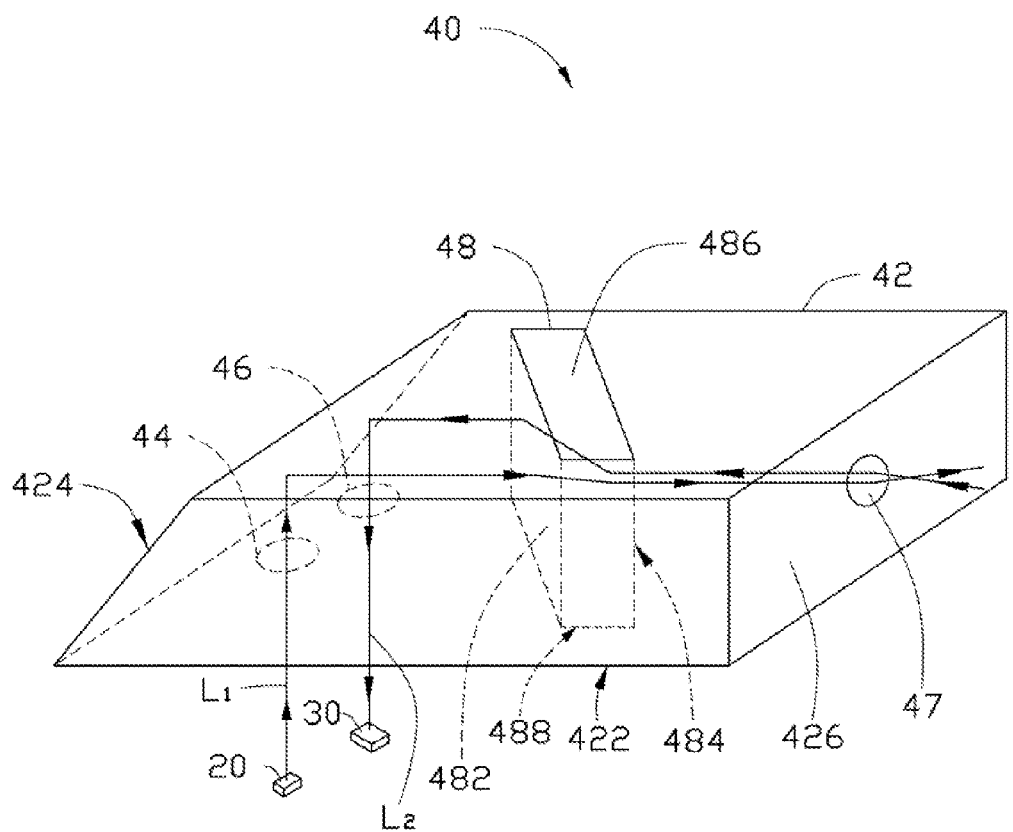
FIG. 3 is a schematic view, showing the light path of the optical transceiver system.

Referring to FIGS. 1-3, the light guide member 40 is engaged with the substrate 10 and is apart from the supporting surface 102. The light guide member 40 includes a lens block 42, a first lens 44, a second lens 46, a third lens 47, and a light guide portion 48.

The lens block 42 is made of transparent material and may be in a wedge-shape. The lens block 42 includes a bottom surface 422, a first side surface 424, and a second side surface 426. The bottom surface 422 is parallel to and apart from the supporting surface 102 and faces the transmitter 20 and the receiver 30. The bottom surface 422 interconnects the first side surface 424 and the second side surface 426. The first side surface 424 is about 45 degrees slanted relative to the bottom surface 422 and the second side surface 426, and is a flat surface having a metallic layer, such as a silver layer. The second side surface 426 is perpendicular to the bottom surface 422. In this embodiment, the bottom surface 422 and the second side surface 426 are planar surfaces.

The first lens 44 and the second lens 46 are formed on the bottom surface 422, and the third lens 47 is formed on the second side surface 426. The first and second lenses 44, 46 are aligned with the respective transmitter 20 and receiver 30. In the present embodiment, the first lens 44, the second lens 46, and the third lens 47 are convex lenses integrally formed with the lens block 42.

The light guide portion 48 is made of transparent material and may be in a rectangular shape. The light guide portion 48 is embedded in the lens block 42, and can be integrally formed with the lens block 42 by insert molding. The light guide portion 48 is perpendicular to the bottom surface 422 and obliquely oriented relative to the second side surface 426. The light guide portion 48 includes a first surface 482, a second surface 484, a third surface 486, and a fourth surface 488. The first surface 482 is parallel to the second surface 484. The first surface 482 is perpendicular to the third surface 486 and the fourth surface 488, and faces toward the first side surface 424. The second surface 484 is perpendicular to the third surface 486 and the fourth surface 488, and faces toward the second side surface 426. The third surface 486 and the fourth surface 488 are parallel to the bottom surface 422. The light guide portion 48 is configured for guiding the first light beam L1 emitted by the transmitter 20 into the third lens 47 and guiding the second light beam L2 passing through the third lens 47 into the receiver 30. In this embodiment, the index of refraction of the light guide portion 48 is less than that of the lens block 42.

The connector 50 includes a connector body 52, a fourth lens 54, and two plugs 56. The connector body 52 is substantially a cuboid and includes a lower surface 522, a front surface 524, and a back surface 526. The lower surface 522 is parallel to and apart from the supporting surface 102. The lower surface 522 perpendicularly interconnects the front surface 524 and the back surface 526. The front surface 524 faces the second side surface 426. The back surface 526 is parallel to the front surface 524 and faces away from the second side surface 426. A blind hole 528 is defined in the back surface 526. The fourth lens 54 is formed on the front surface 522 and aligned with the third lens 47 and the blind hole 528. The plugs 56 perpendicularly extend from the lower surface 522. The plugs 56 engage in the respective engaging holes 104 so that the connector 50 is mounted on the substrate 10.

The optical fiber 60 is received in the blind hole 528 so that the optical fiber 60 is aligned and optically coupled with the fourth lens 54.

Figure 4:
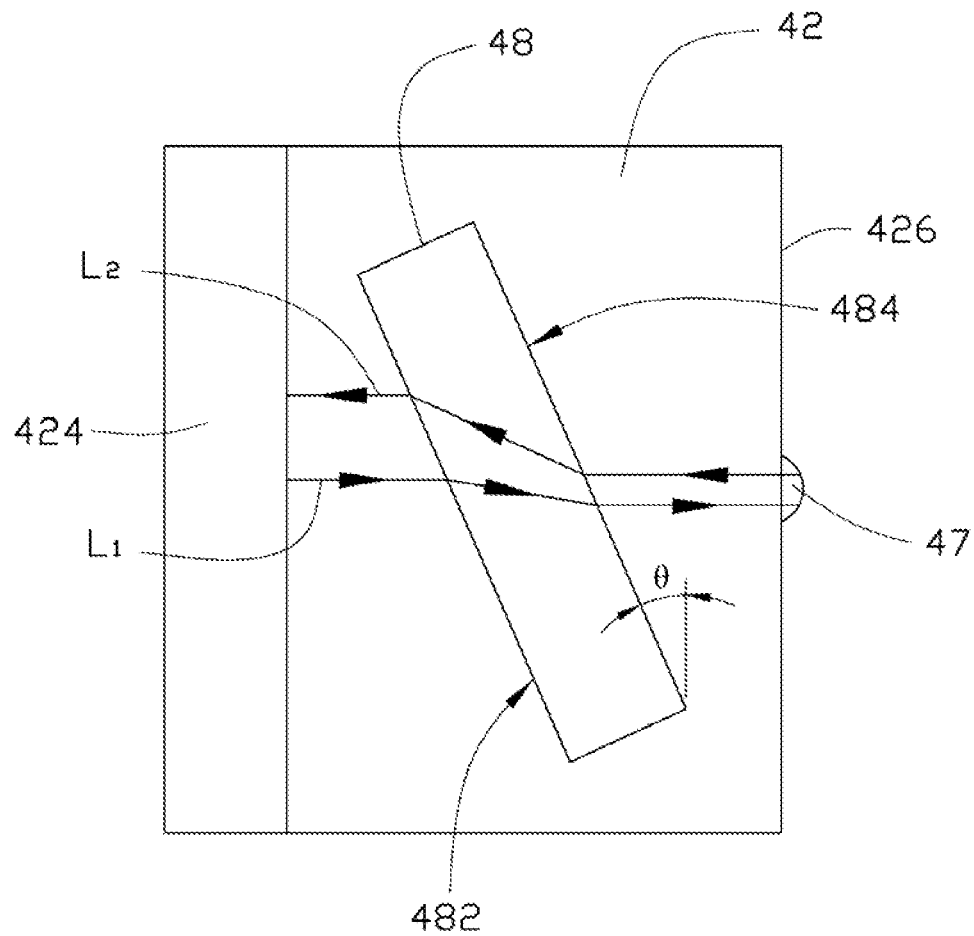
FIG. 4 is a planar view of the light guide member of FIG. 3, showing the light path in the light guide member.

Referring to FIGS. 2-4, when in use, the first light beam L1 emitted by the transmitter 20 perpendicularly enters into the first lens 44 and is reflected about 90 degrees towards the first surface 482 of the light guide portion 48 by the first side surface 424, then the light guide portion 48 receives the first light beam L1 and refracts the first light beam L1 to the third lens 47, next the third lens 47 converges the first light beam L1 to the fourth lens 54, and finally the fourth lens 54 guides the first light beam L1 to the optical fiber 60. The second light beam L2 transmitted from the optical fiber 60 enters first into the fourth lens 54, and then into the third lens 47 and the second surface 484, then the light guide portion 48 receives the second light beam L2 and guides the second light beam L2 towards the first side surface 424, next the first side surface 424 reflects the second light beam L2 towards the second lens 46, and finally the second lens 46 converges the second light beam L2 into the receiver 30. The receiver 30 can convert the second light beam L2 into electrical signals.

During the process, if the locations of the transmitter 20, the receiver 30, and the third lens 47 is certain, the distance between the first light beam L1 and the second light beam L2 in a first area between the first side surface 424 and the first surface 482 will be also certain, and whether both the first light beam L1 and the second light beam L2 pass through the third lens 47 depends on an included angle θ between the light guide portion 48 and the second side surface 426 and the thickness of the light guide portion 48. On the one hand, the impinging locations on the second side surface 426 of the first light beam L1 and the second light beam L2 are determined by the included angle θ. On the other hand, the distance between the first light beam L1 and the second light beam L2 in a second area between the second surface 484 and the second side surface 426 is determined by the thickness of the thickness of the light guide portion 48. For example, when the included angle θ is fixed, the greater the thickness between of the light guide portion 48 is, the less the distance between the first light beam L1 and the second light beam L2 in a second area between the second surface 484 and the second side surface 426 is, thus both the first light beam L1 and the second light beam L2 pass through the third lens 47 more easily.

In the optical transceiver system 100, only a single optical fiber 60 is needed. Therefore, the optical transceiver system 100 is compact.

In another embodiment, the fourth lens 54 can be omitted, and the optical fiber 60 is aligned and directly optically coupled with the third lens 47. In this situation, the first light beam L1 emitted by the transmitter 20 perpendicularly enters into the first lens 44 and is reflected about 90 degrees towards the first surface 482 of the light guide portion 48 by the first side surface 424, then the light guide portion 48 receives the first light beam L1 and refracts the first light beam L1 to the third lens 47, next the third lens 47 converges the first light beam L1 to the optical fiber 60. The second light beam L2 transmitted from the optical fiber 60 enters first into the third lens 47 and then into the second surface 484, then the light guide portion 48 receives the second light beam L2 and guides the second light beam L2 towards the first side surface 424, next the first side surface 424 reflects the second light beam L2 towards the second lens 46, and finally the second lens 46 converges the second light beam L2 into the receiver 30.

Even though numerous characteristics and advantages of the present embodiments have been set fourth in the foregoing description, together with details of the structures and functions of the embodiments, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. An optical transceiver system comprising:
   a transmitter configured for emitting a first light beam having a first wavelength;
   a receiver configured for receiving a second light beam having a second wavelength;
   an optical fiber configured for transmitting the first light beam and the second light beam; and
   a light guide member comprising:
      a lens block comprising a bottom surface facing toward both the transmitter and the receiver, a first side surface slanted relative to the bottom surface, and a second side surface facing toward the optical fiber,
      a first lens formed on the bottom surface and optically coupled with the transmitter;
      a second lens formed on the bottom surface and optically coupled with the receiver; and
      a third lens formed on the second side surface and optically coupled with the optical fiber; and
   a light guide portion embedded in the lens block and perpendicular to the bottom surface and obliquely oriented relative to the second side surface, the first side surface configured for reflecting first light beam from the transmitter, the light guide portion configured for guiding and directing the reflecting first light beam to the third lens, and guiding and directing the second light beam passing through the third lens to the first side surface, the first side surface further configured for reflecting and directing the second light beam to the second lens, wherein the index of refraction of the light guide portion is less than that of the lens block.

2. The optical transceiver system as claimed in claim 1, wherein the light guide portion is integrally formed with the lens block.

3. The optical transceiver system as claimed in claim 1, wherein the first lens, the second lens, and the third lens are convex lens integrally formed with the lens block.

4. The optical transceiver system as claimed in claim 1, wherein the light guide portion comprises a first surface parallel to the bottom surface, a second surface parallel to the first surface, a third surface slanted relative to the second side surface and the bottom surface and facing toward the first side surface, and a fourth surface parallel to the third surface facing toward the second side surface.

5. The optical transceiver system as claimed in claim 4, further comprising a a connector having a fourth lens and a connector body, wherein the fourth lens is formed on the connector body and is aligned and optically coupled with the third lens, and the optical fiber is received in the connector body and aligned and optically coupled with the fourth lens.

6. The optical transceiver system as claimed in claim 1, wherein the first side surface is about 45 degrees relative to the bottom surface.

7. The optical transceiver system as claimed in claim 6, further comprising a substrate, wherein the substrate comprises a supporting surface, and the transmitter, the receiver, the light guide member, the connector, and the optical fiber are positioned on the supporting surface.

8. The optical transceiver system as claimed in claim 7, wherein two engaging holes are defined in the supporting surface, the connector comprises two plugs corresponding to the two engaging holes and extending from the connector body, and the two plugs engage in the respective engaging holes.

9. The optical transceiver system as claimed in claim 8, wherein the connector body is substantially a cuboid.

10. The optical transceiver system as claimed in claim 9, a blind hole is defined in the back surface, the fourth lens is formed on the front surface and aligned with the third lens and the blind hole, and the optical fiber is received in the blind hole.

11. The optical transceiver system as claimed in claim 8, wherein the connector body comprises a lower surface, a front surface, and a back surface, the lower surface is parallel to and apart from the supporting surface, the lower surface perpendicularly interconnects the front surface and the back surface, the front surface faces the second side surface, and the back surface faces away from the second side surface.

12. The optical transceiver system as claimed in claim 1, wherein the first side surface is a flat surface having a metallic layer formed thereon.

\* \* \* \* \*